(12) United States Patent
Pitts

(10) Patent No.: US 11,641,445 B2
(45) Date of Patent: *May 2, 2023

(54) PERSONALIZED AUTOMATIC VIDEO CROPPING

(71) Applicant: Google LLC, Mountain View, CA (US)

(72) Inventor: Colvin Pitts, Mountain View, CA (US)

(73) Assignee: Google LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/665,748

(22) Filed: Feb. 7, 2022

(65) Prior Publication Data

US 2022/0159213 A1 May 19, 2022

Related U.S. Application Data

(63) Continuation of application No. 17/114,852, filed on Dec. 8, 2020, now Pat. No. 11,277,583.

(60) Provisional application No. 62/948,179, filed on Dec. 13, 2019.

(51) Int. Cl.
*G06N 20/00* (2019.01)
*G11B 27/034* (2006.01)
(Continued)

(52) U.S. Cl.
CPC ........... *H04N 7/0122* (2013.01); *G06N 20/00* (2019.01); *G06V 20/46* (2022.01); *G06V 40/161* (2022.01);
(Continued)

(58) Field of Classification Search
CPC ...... H04N 7/0122; H04N 7/013; G06N 20/00; G06K 9/00228; G06K 9/00744; G11B 27/034; G11B 27/34
See application file for complete search history.

(56) References Cited

U.S. PATENT DOCUMENTS

| 7,612,832 B2 * | 11/2009 | Zhang | G06V 20/40 |
|---|---|---|---|
| | | | 348/700 |
| 9,620,168 B1 * | 4/2017 | Townsend | G06T 7/90 |
| | (Continued) | | |

FOREIGN PATENT DOCUMENTS

| JP | 2015-170973 | 9/2015 |
|---|---|---|
| WO | WO 2019/112642 | 6/2019 |

OTHER PUBLICATIONS

"International Preliminary Report of Patentability in PCT/US20/063704", dated Mar. 23, 2022, 7 pages.
(Continued)

*Primary Examiner* — Thai Q Tran
*Assistant Examiner* — Jose M Mesa
(74) *Attorney, Agent, or Firm* — IP Spring

(57) ABSTRACT

Described are methods, systems, and computer-readable media to automatically crop videos using personalized parameters. Some implementations include a computer-implemented method that comprises obtaining an input video, determining a per-frame crop score for one or more candidate crop regions in each frame of the input video, generating a face signal for the one or more candidate crop regions, adjusting each per-frame crop score based on the face signal, determining a minimal cost path that represents crop region locations based on motion cost and the adjusted per-frame crop score, generating crop keyframing corresponding to the crop region locations along the minimal cost path, wherein the crop keyframing includes a start frame, an end frame, and crop region location, and outputting a modified video that has one or more of an output aspect ratio or an output orientation that is different than a corresponding aspect ratio or an orientation of the input video.

20 Claims, 8 Drawing Sheets

(51) Int. Cl.
  *G11B 27/34*   (2006.01)
  *H04N 7/01*    (2006.01)
  *G06V 20/40*   (2022.01)
  *G06V 40/16*   (2022.01)

(52) U.S. Cl.
  CPC .......... *G06V 40/171* (2022.01); *G11B 27/034* (2013.01); *G11B 27/34* (2013.01); *H04N 7/013* (2013.01)

(56) References Cited

U.S. PATENT DOCUMENTS

| | | | |
|---|---|---|---|
| 9,818,451 B1* | 11/2017 | Tyagi | G11B 27/3081 |
| 2008/0260347 A1* | 10/2008 | Widdowson | G11B 27/034 386/278 |
| 2017/0249719 A1* | 8/2017 | Kansara | G06T 3/0012 |

OTHER PUBLICATIONS

KIPO, Office Action (with English translation) for Korean Patent Application No. 10-2022-7010068, dated May 17, 2022, 6 pages.
"First Examination Report in IN Application No. 202247016156", dated Aug. 1, 2022, 7 Pages.
"International Search Report and Written Opinion in International Application dated Dec. 8,2020No. PCT/US2020/063704, filed", Mar. 30, 2021, 10 Pages.
Michael L Gleicher, et al., "Re-cinematography", Proceedings of the 15th International Conference on Multimedia 2007, Augsburg, Germany, Sep. 24-29, 2007, ACM, US, Sep. 29, 2007, Sep. 29, 2007, pp. 27-36.
"Japanese Office Action dated Nov. 22, 2022 in JP Application No. 2022-519751", dated Nov. 22, 2022, 2 pages.

\* cited by examiner

PERSONALIZED AUTOMATIC VIDEO CROPPING

RELATED APPLICATIONS

This application is a continuation of U.S. application Ser. No. 17/114,852, filed Dec. 8, 2020, entitled, "Personalized Automatic Video Cropping", which claims priority to U.S. Provisional Patent Application No. 62/948,179, filed Dec. 13, 2019, entitled, "Personalized Automatic Video Cropping," and which are incorporated by reference herein in their entirety.

BACKGROUND

When reviewing video (and images) on devices, the display aspect ratio and/or orientation of the device often may not match the aspect ratio of the media. As a result, the media is often letterboxed for display (e.g., with large black borders on the sides and a reduced video size or still image size between the borders). In some cases, the viewer software application may crop the original media to avoid letterboxing.

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

SUMMARY

Some implementations can include a method. The method can include obtaining an input video that includes a plurality of frames and determining a per-frame crop score for one or more candidate crop regions in each frame of the input video. The method can also include generating, using a trained machine-learning model, a face signal for the one or more candidate crop regions within each frame of the input video and adjusting each per-frame crop score based on the face signal of the one or more candidate crop regions. In some implementations, the face signal may indicate whether at least one important face is detected in a candidate crop region.

The method can further include determining a minimal cost path that represents crop region locations for the input video based on motion cost and the adjusted per-frame crop score for the one or more candidate crop regions and generating crop keyframing corresponding to the crop region locations along the minimal cost path, wherein the crop keyframing includes a start frame, an end frame, and crop region location. The method can also include outputting a modified video that has one or more of an output aspect ratio or an output orientation that is different than a corresponding input aspect ratio or an input orientation of the input video, wherein the input aspect ratio or input orientation are parameters used during capture of the input video.

In some implementations, adjusting each per-frame crop score includes one of: increasing the per-frame crop score by a first value if a face is determined to be present in the candidate crop region corresponding to the per-frame crop score; or increasing the per-frame crop score by a second value if an important is determined to be present in the candidate crop region corresponding to the per-frame crop score, where the second value is larger than the first value.

The method can also include determining a quality score of the crop keyframing and performing automatic video cropping of the input video based on the quality score. The method can further include determining a confidence score of the crop keyframing and performing automatic video cropping of the input video based on the confidence score.

In some implementations, determining the per-frame crop score includes determining, for each candidate crop region, one or more of an aesthetic score, a face analysis score, or active speaker presence. In some implementations, generating the crop keyframing includes interpolating between two keyframes. In some implementations, the interpolation includes applying Bezier splines.

In some implementations, generating the face signal includes accessing one or more personalized parameters. In some implementations, the one or more personalized parameters include face identity information for one or more important faces. In some implementations, outputting the modified video includes displaying the modified video on a display.

The method can also include prior to obtaining the input video, receiving a video playback command at a device and in response to receiving the video playback command, detecting a device orientation and a display aspect ratio for the device. The method can further include determining a crop region based on the device orientation and the display aspect ratio for the device.

Some implementations can include a non-transitory computer readable medium having stored thereon software instructions that, when executed by one or more processors, cause the one or more processors to perform operations. The operations can include obtaining an input video that includes a plurality of frames, determining a per-frame crop score for one or more candidate crop regions in each frame of the input video, and generating, using a trained machine-learning model, a face signal for the one or more candidate crop regions within each frame of the input video. In some implementations, the face signal may indicate whether at least one important face is detected in a candidate crop region. The operations can also include adjusting each per-frame crop score based on the face signal of the one or more candidate crop regions and determining a minimal cost path that represents crop region locations for the input video based on motion cost and the adjusted per-frame crop score for the one or more candidate crop regions.

The operations can also include generating crop keyframing corresponding to the crop region locations along the minimal cost path, wherein the crop keyframing includes a start frame, an end frame, and crop region location and outputting a modified video that has one or more of an output aspect ratio or an output orientation that is different than a corresponding input aspect ratio or an input orientation of the input video, wherein the input aspect ratio or input orientation are parameters used during capture of the input video.

In some implementations, adjusting each per-frame crop score includes one of increasing the per-frame crop score by a first value if a face is determined to be present in the candidate crop region corresponding to the per-frame crop score or increasing the per-frame crop score by a second value if an important face is determined to be present in the candidate crop region corresponding to the per-frame crop score, wherein the second value is larger than the first value.

The operations can further include determining a quality score of the crop keyframing and performing automatic video cropping of the input video based on the quality score. The operations can also include determining a confidence score of the crop keyframing and performing automatic video cropping of the input video based on the confidence score.

In some implementations, determining the per-frame crop score includes determining, for each candidate crop region, one or more of an aesthetic score, a face analysis score, or active speaker presence. In some implementations, generating the crop keyframing includes interpolating between two keyframes. In some implementations, the interpolation includes applying Bezier splines. In some implementations, generating the face signal includes accessing one or more personalized parameters.

Some implementations can include a system comprising one or more processors coupled to a non-transitory computer readable medium having stored thereon software instructions that, when executed by the one or more processors, cause the one or more processors to perform operations. The operations can include obtaining an input video that includes a plurality of frames, determining a per-frame crop score for one or more candidate crop regions in each frame of the input video, and generating, using a trained machine-learning model, a face signal for the one or more candidate crop regions within each frame of the input video. In some implementations, the face signal may indicate whether at least one important face is detected in a candidate crop region. The operations can also include adjusting each per-frame crop score based on the face signal of the one or more candidate crop regions and determining a minimal cost path that represents crop region locations for the input video based on motion cost and the adjusted per-frame crop score for the one or more candidate crop regions.

The operations can also include generating crop keyframing corresponding to the crop region locations along the minimal cost path, wherein the crop keyframing includes a start frame, an end frame, and crop region location and outputting a modified video that has one or more of an output aspect ratio or an output orientation that is different than a corresponding input aspect ratio or an input orientation of the input video, wherein the input aspect ratio or input orientation are parameters used during capture of the input video.

DETAILED DESCRIPTION

Figure 1:
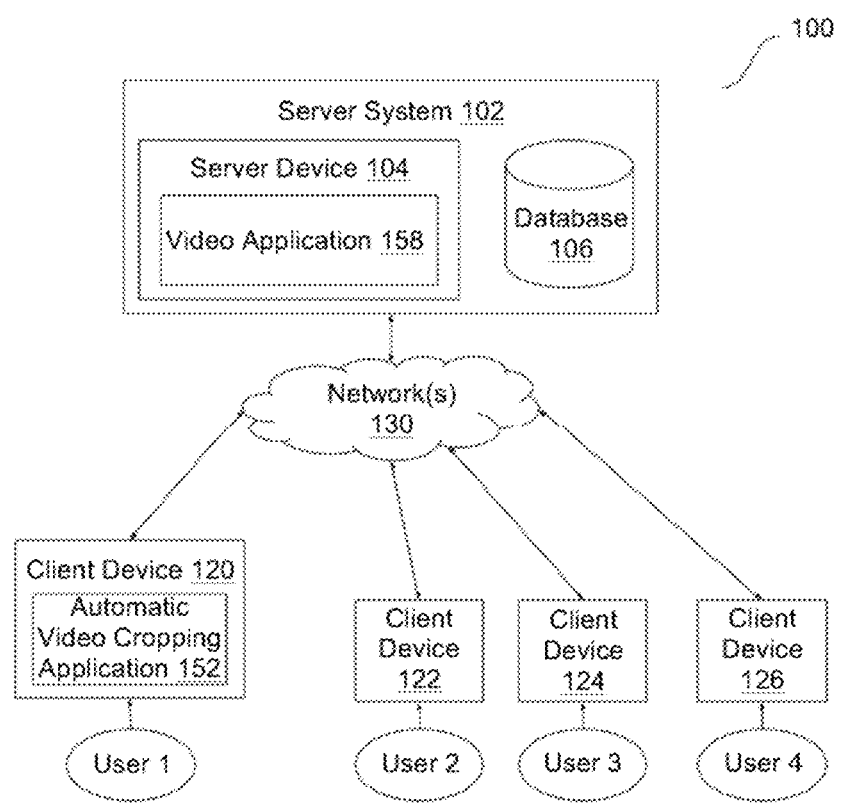
FIG. 1 is a block diagram of an example network environment which may be used for one or more implementations described herein.

Some implementations described herein relate to methods, systems, and computer-readable media to automatically crop video. The described implementations can automatically crop video with personalized parameters using a trained machine-learning model. Training data for the model may include personalized information for a user, accessed with user permission. The personalized information can include face identity information for faces stored in local storage (e.g., on device).

Some implementations described herein relate to methods, systems, and computer-readable media to automatically perform personalized video cropping. Different video platforms and delivery devices can have different aspect ratios including 4:3 (landscape), 9:16 (portrait), and 1:1 (square), where the first number refers to the width and the second number refers to the height of the video.

The described techniques can automatically perform personalized video cropping at the time of video playback (e.g., cropping for display of a landscape oriented video for display in portrait or square format), without interrupting the user, based on personalized parameters such as important to the user (recognized, familiar, or known to the user, e.g., based on image/videos in a user's image library) faces. A user may have an image and video library (e.g., images stored and managed by an image management software application) that includes a plurality of images and/or videos captured by the user, or otherwise added to the library (e.g., images shared with the user by other users). The library may be local on a user device (e.g., a smartphone) and/or on a server (e.g., a cloud-based image/video hosting service). For example, a user may use one or more devices such as a smartphone, a digital camera, a wearable device, etc. to capture images and/or videos of various persons, and store such images in their library. The library may include images/videos of persons (or animals) known to the users, e.g., family members, friends, co-workers, pets, etc. In some implementations, important faces may also include faces not in the user's library, but identified based on other sources of images such as such as the user's social graph, social media account, email account, the user's electronic address book, accessed with user permission.

If the user denies permission to access the library or any of the other sources, such sources are not access, and important face determination is not performed. Further, the user may exclude one or more faces from being recognized and/or included as an important face. Still further, the user can be provided with options (e.g., a user interface) to manually indicate important faces. The term face as used herein can refer to a human face, and/or any other face that can be detected using face detection techniques (e.g., the face of a pet or other animal).

Some image management applications may include functionality, enabled with user permission, to detect faces of persons and/or pets in an image or video. If the user permits, such image management applications may detect faces in the images/videos in the user's library and determine a frequency of occurrence of each face. For example, faces of persons such as a spouse, sibling, parent, close friend, etc. may occur with a high frequency in the images/videos in a user's library while other persons such as bystanders (e.g., at a public venue) may occur infrequently. In some implementations, faces that occur with a high frequency may be identified as important faces. In some implementations, e.g., when the library enables users to tag or label faces, users may indicate names (or other information) for faces that occur in their library. In these implementations, faces for which users have provided names or other information may be identified as important faces. Other faces that are detected in the image library may be identified as unimportant.

Per various implementations, video cropping and determination of important faces are performed locally on a client device and do not require network connectivity. The described techniques enable an improved video playback experience when the video is being viewed on a device with an aspect ratio that is different than the aspect ratio of the video or in a device orientation (e.g., portrait vs landscape) that is not suited to orientation that the video was captured or stored in. The described techniques can be implemented on any device, e.g., a mobile device, that plays back video.

In some implementations, automatic video cropping can include three phases: per-frame crop scoring, temporal coherency, and motion smoothing. Per-frame crop scoring can be image based, which can be noisy and include a variety of different scores. In some implementations, a heuristic combination can be used to generate a single per-frame score for a candidate crop region. The second phase can include temporal coherency, which can include operations to fit a smooth, optimal path through space and time. Temporal coherency can include a representation of scene motion. The third phase can include motion smoothing and heuristics incorporation. In this phase, local optimization may be performed for aspects of the video that may not be tractable globally. Specific heuristics and rules can be applied to deal with specific cases.

FIG. 1 illustrates a block diagram of an example network environment 100, which may be used in some implementations described herein. In some implementations, network environment 100 includes one or more server systems, e.g., server system 102 in the example of FIG. 1. Server system 102 can communicate with a network 130, for example. Server system 102 can include a server device 104 and a database 106 or other storage device. In some implementations, server device 104 may provide video application 158.

Network environment 100 also can include one or more client devices, e.g., client devices 120, 122, 124, and 126, which may communicate with each other and/or with server system 102 and/or second server system 140 via network 130. Network 130 can be any type of communication network, including one or more of the Internet, local area networks (LAN), wireless networks, switch or hub connections, etc.

For ease of illustration, FIG. 1 shows one block for server system 102, server device 104, database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems via the network 130. In some implementations, server system 102 can include cloud hosting servers, for example. In some examples, database 106 and/or other storage devices can be provided in server system block(s) that are separate from server device 104 and can communicate with server device 104 and other server systems via network 130.

Also, there may be any number of client devices. Each client device can be any type of electronic device capable of communication, e.g., desktop computer, laptop computer, portable or mobile device, cell phone, smart phone, tablet computer, television, TV set top box or entertainment device, wearable devices (e.g., display glasses or goggles, wristwatch, headset, armband, jewelry, etc.), personal digital assistant (PDA), etc. Some client devices may also have a local database similar to database 106 or other storage. In some implementations, network environment 100 may not have all of the components shown and/or may have other elements including other types of elements instead of, or in addition to, those described herein.

In various implementations, end-users U1, U2, U3, and U4 may communicate with server system 102 and/or each other using respective client devices 120, 122, 124, and 126. In some examples, users U1, U2, U3, and U4 may interact with each other via applications running on respective client devices and/or server system 102 and/or via a network service, e.g., a social network service or other type of network service, implemented on server system 102. For example, respective client devices 120, 122, 124, and 126 may communicate data to and from one or more server systems, e.g., server system 102.

In some implementations, the server system 102 may provide appropriate data to the client devices such that each client device can receive communicated content or shared content uploaded to the server system 102. In some examples, users U1-U4 can interact via audio or video conferencing, audio, video, or text chat, or other communication modes or applications.

A network service implemented by server system 102 can include a system allowing users to perform a variety of communications, form links and associations, upload and post shared content such as images, text, video, audio, and other types of content, and/or perform other functions. For example, a client device can display received data such as content posts sent or streamed to the client device and originating from a different client device via a server and/or network service (or from the different client device directly), or originating from a server system and/or network service.

In some implementations, any of client devices 120, 122, 124, and/or 126 can provide one or more applications. For example, as shown in FIG. 1, client device 120 may provide an automatic video cropping application 152. Client devices 122-126 may also provide similar applications. The automatic video cropping application 152 may be implemented using hardware and/or software of client device 120. In different implementations, the automatic video cropping application 152 may be a standalone client application, e.g., executed on any of client devices 120-124. The automatic video cropping application 152 may provide various functions related to videos, e.g., automatically cropping videos to change from one aspect ratio to another, etc.

A user interface on a client device 120, 122, 124, and/or 126 can enable the display of user content and other content, including images, video, data, and other content as well as communications, settings, notifications, and other data. Such a user interface can be displayed using software on the client device, software on the server device, and/or a combination of client software and server software executing on server device 104. The user interface can be displayed by a display device of a client device, e.g., a touchscreen or other display screen, projector, etc. In some implementations, the server may simply enable users to stream/download videos over a network, and with user permission, enable upload/storage of videos sent by user.

Other implementations of features described herein can use any type of system and/or service. For example, other networked services (e.g., connected to the Internet) can be used instead of or in addition to a social networking service. Any type of electronic device can make use of features described herein. Some implementations can provide one or more features described herein on one or more client or server devices disconnected from or intermittently connected to computer networks.

Figure 2A:
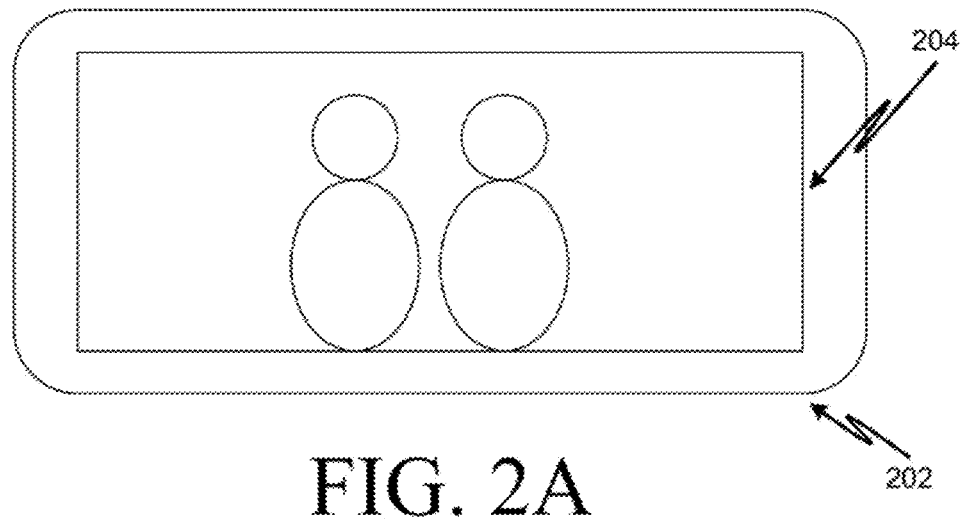
FIGS. 2A and 2B are diagrams of a landscape video format and pillarboxed format.
Figure 2B:
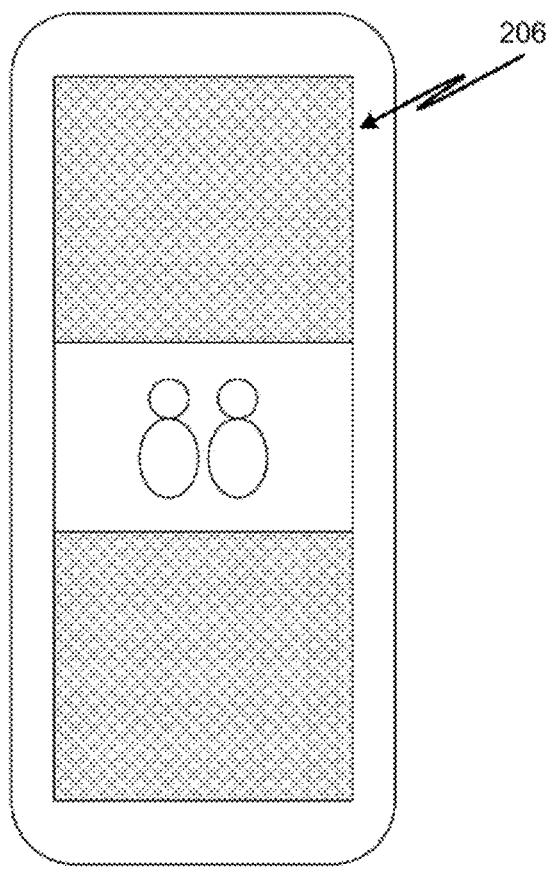

FIG. 2A is a diagram of a video in landscape format in accordance with some implementations. FIG. 2B is a diagram of the video shown in FIG. 2A when viewed on a device in portrait orientation where the video is pillarboxed. FIG. 2A shows a user device 202 displaying a video in landscape mode 204. FIG. 2B shows that the device is now in portrait mode and that the video 204 that has been pillarboxed 206 for display in portrait orientation. As can be seen in FIG. 2B, the portion of the display screen of the device that is occupied by the video is substantially smaller when the video is pillarboxed to be displayed in portrait orientation.

Figure 3A:
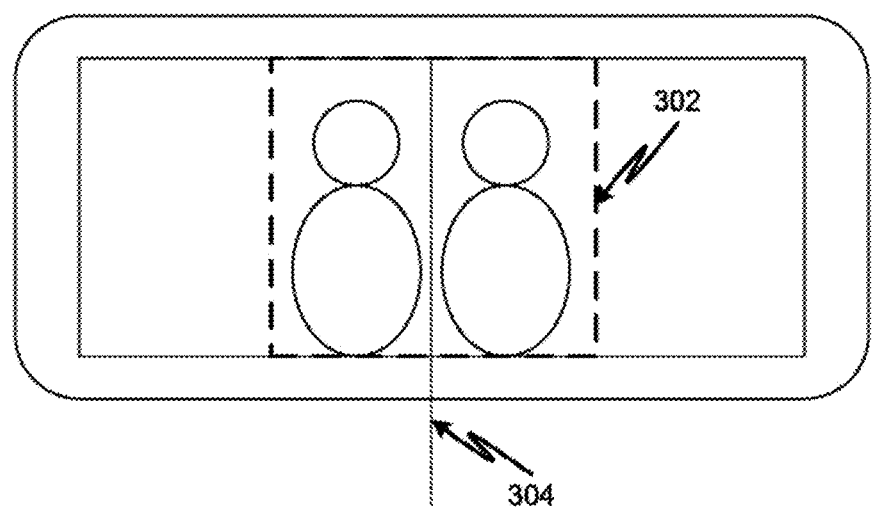
FIGS. 3A and 3B show a cropping rectangle on the horizontal video and a cropped video displayed in portrait orientation in accordance with some implementations.
Figure 3B:
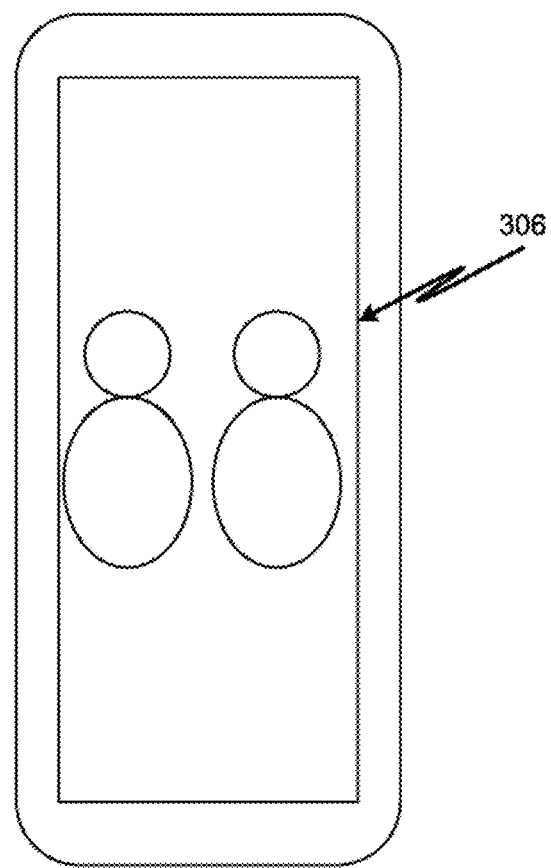

FIG. 3A is a diagram showing a cropping rectangle on the horizontal video in accordance with some implementations. FIG. 3B is a diagram showing a cropped video displayed in portrait orientation in accordance with some implementations. FIG. 3A shows a single frame of a video in landscape orientation in which a crop region 302 is shown in a dashed line. The crop region 302 is located at an x-location 304. As discussed below, the automatic cropping process generates x-locations for crop regions (landscape to portrait cropping) across the time domain of a video. More generally, the process generates a crop window (x, y, width, height) relative to a source video.

Figure 4:
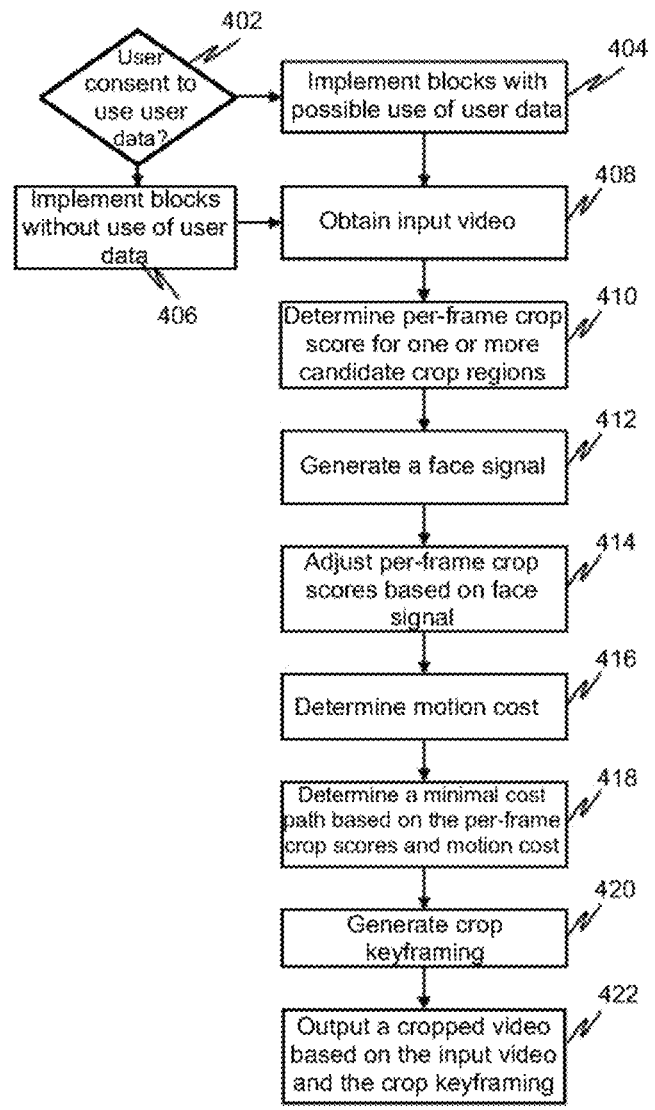
FIG. 4 is a flow diagram showing processing to automatically crop video in accordance with some implementations.

FIG. 4 is a flow diagram illustrating an example method 400 to automatically crop videos personalized to a user, according to some implementations. In some implementations, method 400 can be implemented, for example, on a server system 102 as shown in FIG. 1. In some implementations, some or all of the method 400 can be implemented on one or more client devices 120, 122, 124, or 126 as shown in FIG. 1, one or more server devices, and/or on both server device(s) and client device(s). In described examples, the implementing system includes one or more digital processors or processing circuitry ("processors"), and one or more storage devices (e.g., a database 106 or other storage). In some implementations, different components of one or more servers and/or clients can perform different blocks or other parts of the method 400. In some examples, a first device is described as performing blocks of method 400. Some implementations can have one or more blocks of method 400 performed by one or more other devices (e.g., other client devices or server devices) that can send results or data to the first device.

In some implementations, the method 400, or portions of the method, can be initiated automatically by a system. In some implementations, the implementing system is a first device. For example, the method (or portions thereof) can be performed based on one or more particular events or conditions, e.g., playback of a video on a client device, preparing a video for uploading from a client device, and/or one or more other conditions occurring which can be specified in settings read by the method.

Method 400 may begin at block 402. In block 402, it is checked whether user consent (e.g., user permission) has been obtained to use user data in the implementation of method 200. For example, user data can include important faces and additional user criteria, user images in an image collection (e.g., images captured by a user, uploaded by a user, or otherwise associated with a user), information about a user's social network and/or contacts, user characteristics (identity, name, age, gender, profession, etc.), social and other types of actions and activities, calendar and appointments, content, ratings, and opinions created or submitted by a user, a user's geographical location, historical user data, etc. One or more blocks of the methods described herein may use such user data in some implementations. Block 402 may be performed as part of an automatic video cropping framework level such that blocks 404 and on will only be invoked if user consent for performing the automatic cropping application was obtained at the framework level. If user consent has been obtained from the relevant users for which user data may be used in the method 400, then in block 404, it is determined that the blocks of the methods herein can be implemented with possible use of user data as described for those blocks, and the method continues to block 406. If user consent has not been obtained, it is determined in block 406 that blocks are to be implemented without use of user data, and the method continues to block 406. In some implementations, if user consent has not been obtained, the remainder of method 400 is not performed, and/or particular blocks needing the user data are not performed. For example, blocks 412-414 are skipped if a user does not provide permission. Also, recognition of important faces can be based on local stored data and can be performed locally on the user device. The user can designate specific important faces to recognize or not recognize, remove designations, or stop using important face based automatic cropping at any time.

At block 408, an input video is obtained. For example, a video stored in memory on a user device is accessed. The video can include a plurality of frames. The input video has an orientation (vertical/horizontal) and an aspect ratio, e.g., 4:3, 16:9, 18:9, etc. For example, the aspect ratio may be selected at the time of video capture, e.g., based on camera parameters of the device that captures the video. Block 408 may be followed by block 410.

At block 410, a per-frame crop score is determined for one or more candidate crop regions for each frame of the input video. A candidate crop region may be a region that matches a viewing orientation of a device on which the video is viewed and may have the same aspect ratio as the device, such that a video cropped to the region occupies substantially the entire screen (or window, if the video is played in windowed user interfaces). For example, if an input video that is a landscape (horizontal dimension greater than vertical dimension) and that has an aspect ratio of 4000×3000 pixels is to be displayed on a square display of 2000×2000 pixels, each candidate crop region may be 3000×3000 pixels, matching the dimension of 3000 pixels). The selected crop region of 3000×3000 pixels may be scaled to fit the square display, e.g., scaled down to 2000×2000 pixels. The selection of a higher resolution crop region followed by scaling can preserve a large proportion of the original content. Alternatively, candidate crop regions that match the display of 2000×2000 pixels may be chosen.

The crop score can include one or more individual scores. When more than one score is used, there can be a heuristic that determines how the individual scores are combined into a single score. The individual scores can include an aesthetic score (e.g., from 508), a score based on face/person analysis (e.g., 506), and/or active speaker analysis (e.g., 504). Further, some implementations may include one or more additional scores based on object detection, pet or animal detection, or optical character recognition (OCR). For example, crop regions that include salient objects as identified using object detection techniques may be assigned a higher score than regions where no salient objects are detected or only partial objects are detected. For example, if the video depicts a nature scene, a crop region with salient objects such as trees, mountains, or other objects may be assigned a higher score than a crop region with no salient objects, e.g., that includes just the sky.

In another example, crop regions that depict a pet (e.g., a dog, a cat, or other pet animal that is tagged in a personal image/video library of a user, accessed with user permission) or other animal may be assigned a higher score than regions that exclude the pet or animal, or only partially depict the pet or animal. In yet another example, regions that include text as recognized using OCR may be assigned a higher score. For example, if the video includes a storefront with signage that includes text, crop regions that include the signage may assigned a higher score than crop regions that exclude or only partially depict the signage. The per-frame crop score can include a score for a candidate crop region (e.g., a crop rectangle at a given x-location in the video frame). Block 410 may be followed by block 412.

At 412, a face signal is generated and a personalized score is determined. In some implementations, the face signal may indicate whether at least one important face is detected in a candidate crop region. In some implementations, the per-sonalized score can include a score based on whether an important face is present, determined using face detection techniques to detect faces in the frame and determine whether at least one of the faces in the frame matches an important face (e.g., as determined based on user-permitted data such as previous videos or photos of the faces of the people that are in the user's library, or determined by other user-permitted signals such as a viewing user's social graph connections or communications history in email, phone, chat, video call, etc.). The personalized score can be determined based on a signal from a machine learning model that represents the degree to which one or more important faces are in a candidate cropping region, which can be determined by the machine learning model. In addition to determining that one or more important faces are in the candidate cropping region, the personalized score module can also determine the location of the one or more important faces within the candidate cropping region, e.g., whether the face is centered in the candidate cropping region, near to an edge of the candidate cropping region, etc. Block 412 may be followed by block 414.

At 414, the per-frame crop scores are adjusted based on the face signal. For example, if a face is detected in a candidate crop region, then the score for that region may be raised by a first factor. If the candidate crop region is detected to include an important face, then the score for that region may be raised by a second factor that is larger than the first factor.

In some implementations, an intersection of the crop region with a bounding box that includes the face may be determined. For example, face detection techniques can be utilized to determine the bounding box. The crop score may be adjusted based on the intersection. For example, in some implementations, a full intersection (where the whole face is present within the crop region) may receive a full score boost, while partial faces (where a portion of the face is missing from the crop region) may receive a lower score boost, e.g., the score boost may be weighted by the ratio of the area of intersection and the area of face bounding box. Block 408 may be followed by block 416.

At 416, motion cost is determined. In some implementations, motion cost may be a cost associated with selecting a candidate crop region at a particular time (e.g., a particular timestamp in the video), given a potential crop path at one or more previous times (e.g., earlier timestamps in the video) and the motion present in the video. In some implementations, motion cost determination can include analyzing frame to frame motion of a crop region, e.g., using optical flow or other techniques. Results can be clustered into a small number of motion clusters (e.g., clusters that include crop region motion in a group of locations that are close to each other. In some implementations, sparse optical flow can perform better in untextured regions. Motion can be reduced to a small number of clusters (e.g., clusters around areas motion that are relatively close to each other). The clusters may not provide temporal coherency.

Figure 8A:
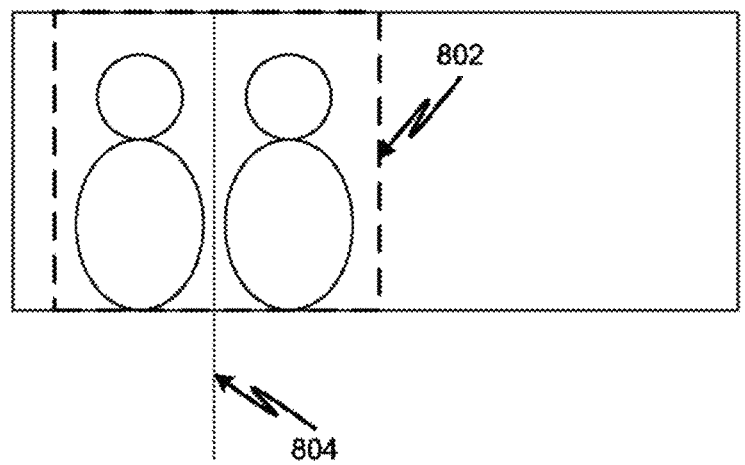
FIGS. 8A-8C show diagrams of example videos with a crop region moving to different location in accordance with some implementations.
Figure 8B:
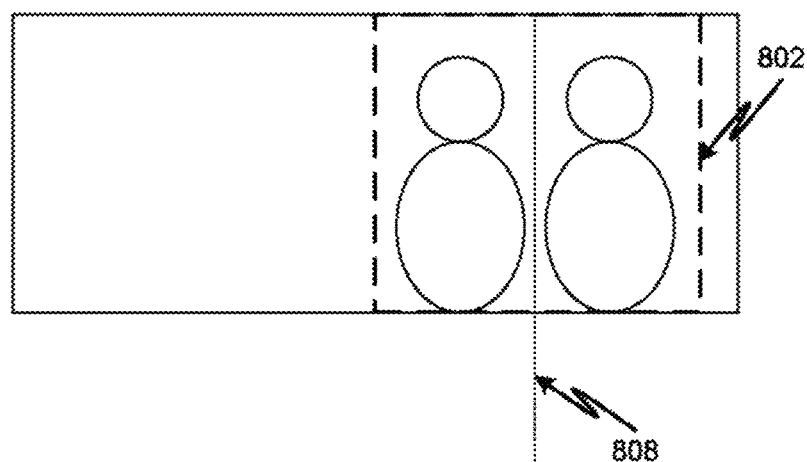
Figure 8C:
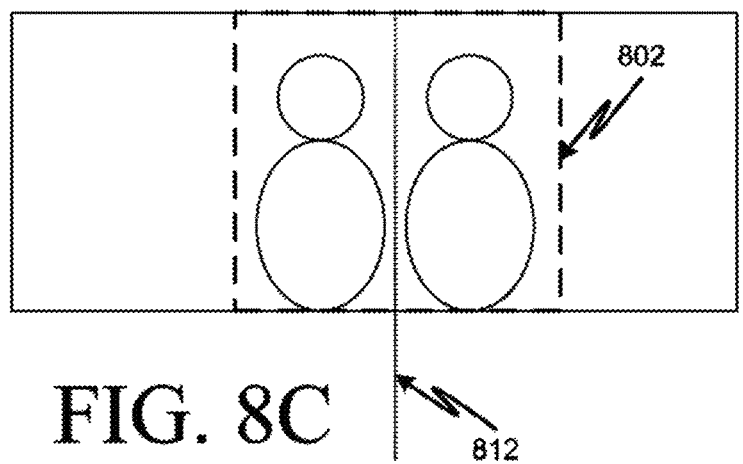

In an example implementation, motion cost may be calculated based on a comparison of the motion of the crop region, relative to the previous time, to the motion of the best matching motion cluster. For example, the best matching motion cluster may be a cluster with a spatial centroid within the crop region and a motion vector that is most similar to the motion of the crop region. Motion cost may be function of the absolute difference in velocity between the best matching motion cluster and the motion of the candidate crop region. A cost value can be assigned to moving the crop region and used to determine the motion cost. For example, FIGS. 8A-8C show a crop region 804 in a video 802, where the crop region 802 moves to a different location during the playback for the video (e.g., 808 and 812) based on the technique described herein. Block 416 may be followed by block 418.

Figure 7:
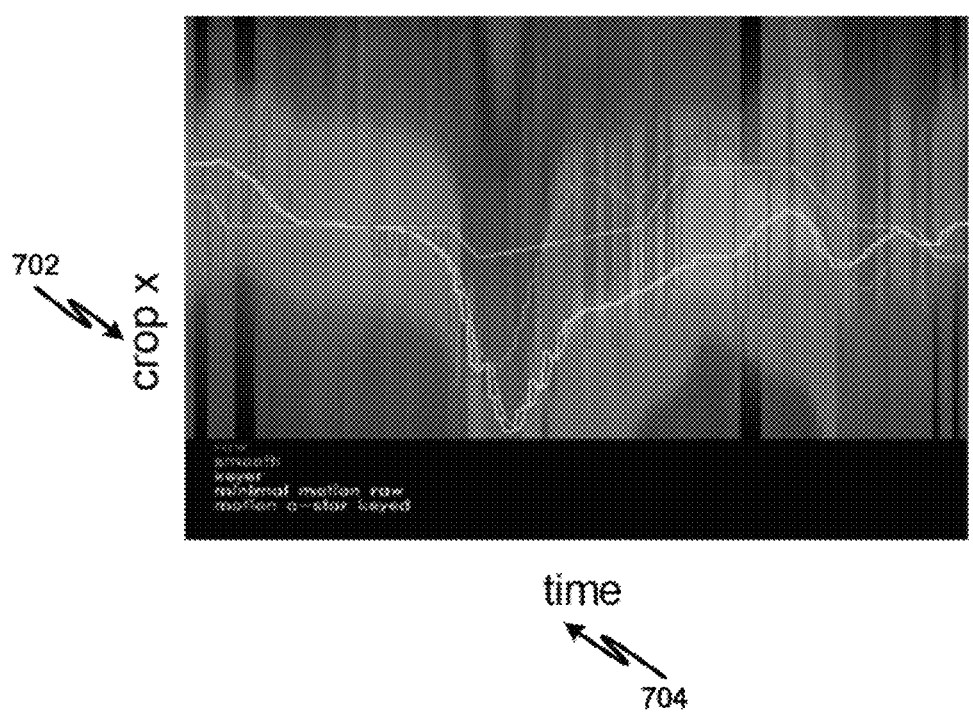
FIG. 7 is a diagram showing an example automatic video cropping path in accordance with some implementations.

At 418, a minimal cost path is determined based on the per-frame crop scores and motion cost determined in 416. In some implementations, the minimal cost path can include obtaining candidate crop regions based on crop scores and performing a minimal cost path finding operation, which can include costs for moving crop region (e.g., the cost of moving the crop region can be based on the distance that the crop region is being moved from frame to frame consecutively, or between a frame and a subsequent frame). The minimal cost path is found by solving for the path of least cost. FIG. 7 shows an example graph 700 that represents a minimal cost path and other factors plotted as a graph, where the y-axis 702 is the x-location of the crop region within the video, and the x-axis is time. Some implementations can include outlier removal in which outliers are removed from the crop region location within the input video to smooth the path of the crop region and remove discontinuities. This can be a byproduct of the minimal cost path. Block 418 may be followed by block 420.

At 420, crop keyframing is generated. Crop keyframing can include a start frame and an end frame and a crop region x-location within the input video. For example, crop path generation may be performed at 5 frames per second (fps) for a video that has a frame rate of 30 fps. In this example, keyframes may be generated at 5 fps, and interpolation techniques such as Bezier spline may be used to generate smooth interpolation at the full framerate of 30 fps of the video. For example, there may be three keyframing sections of the video as shown in FIGS. 8A-8C where each crop keyframing includes a crop region at a different x location. Block 420 may be followed by block 422.

At 422, a cropped video is output based on the input video and crop keyframing. For example, the cropped video can be displayed on a display of the user device. In another example, the cropped video can be uploaded to a video sharing site or the like. The cropped video can have an aspect ratio or orientation that is different than that of the input video.

In some implementations, the output may include crop keyframes and path, instead of or in addition to a cropped video. For example, the crop keyframes and path may be stored in association with the video, e.g., as video metadata. When a viewer application initiates playback of the video, the crop keyframes and path that match the viewer application aspect ratio or orientation (which may be based on the device on which the video is viewed) may be determined and provided to the viewer application. The viewer application may utilize the crop keyframes and path to crop the video during playback. Such an implementation eliminates the need to generate a separate video asset (that matches the viewer application) when the video is being viewed in a viewer application that recognizes the crop keyframes and path, and can utilize the information to crop the video at a time of playback.

Various blocks of method 400 may be combined, split into multiple blocks, or be performed in parallel. For example, blocks 406 and 408 may be combined. In some implementations, the blocks may be performed in a different order. For example, blocks 404-408 and blocks 412-414 may be performed in parallel.

Method 400, or portions thereof, may be repeated any number of times using additional inputs (e.g., additional videos). Method 400 can be implemented with specific user permission. For example, a video playback user interface may be provided that enables the user to specify whether to enable automatic personalized video cropping. The user can be provided with information that performing automatic personalized video cropping on playback may utilize performing face identification using personalized parameters (e.g., stored on the user device), and is provided the option to disable automatic personalized video cropping entirely.

Method 400 may be performed entirely on a client device that is playing back or uploading a video, including face detection and important face determination with specific user permission. Also, faces may be human or other (e.g., animals or pets). Further, a technical benefit of performing the automatic personalized video cropping on the device is that the described method does not require that the client device have an active Internet connection, thus allowing automatic video cropping even when the device is not connected to the Internet. Further, since the method is performed locally, no network resources are consumed. Still further, no user data is sent to a server or other third-party device. The described techniques can therefore address the problem of video playback in an aspect ratio or orientation different than the aspect ratio or orientation the video was captured in with the benefit of personalized parameters in a manner that does not require sharing of user data.

In some implementations, during playback of the video, a change in orientation or aspect ratio of the device can be detected (e.g., when the user rotates the device 90 degrees during playback, or opens a foldable device to double the aspect ratio) and, in response, the cropping can be adjusted (e.g., the crop region can be adjusted to suit the desired output orientation and/or aspect ratio.

The described techniques can advantageously generate a cropped video that is personalized to a user, e.g., the user that is viewing the cropped video. For example, consider a video in landscape orientation (with a width that is greater than height) in which two persons are depicted at either side of the video, e.g., a first person appears near a left edge of the image, while a second person is depicted near a right edge of the image. When such a video is being viewed in a portrait orientation, e.g., on a smartphone or other device, where the screen has a width that is less than the height, conventional, non-personalized cropping can result in a crop region that depicts one of the two persons, chosen independent of the viewing user. In contrast, personalized cropping as described herein can automatically select a particular person (e.g., having an important face) as the focus of the video and choose a crop region that depicts the person. It can be appreciated, for example, that different viewers may find persons depicted in the video to be important, and therefore, the crop regions for different viewers may be different. More generally, when a video depicts multiple subjects, per techniques described herein, the crop region for different viewers may be personalized such that subjects of interest (e.g., important faces, pets, etc.) are preserved in the cropped video.

Figure 5:
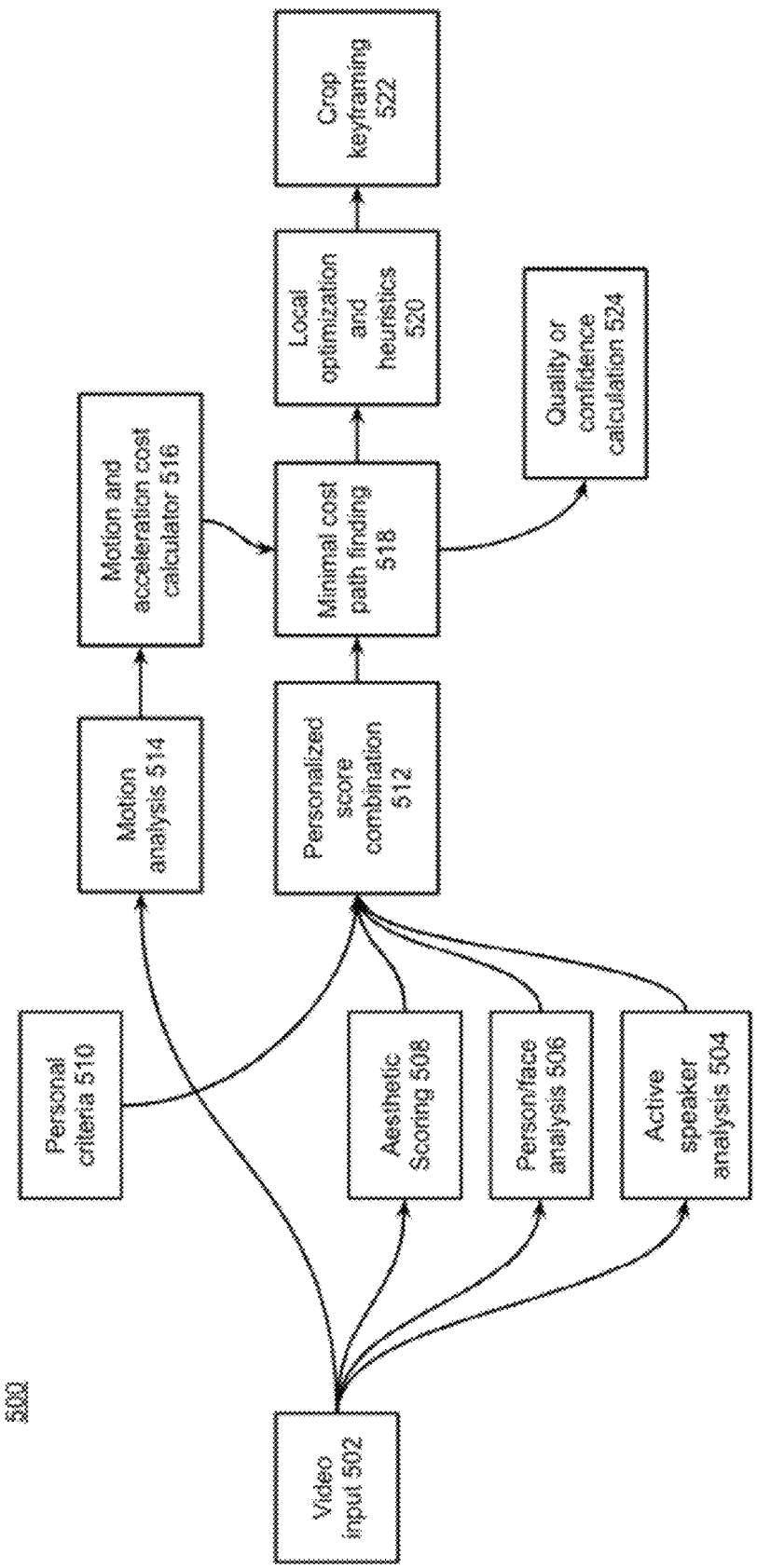
FIG. 5 is flow diagram of an example method to automatically crop video in accordance with some implementations.

FIG. 5 is a diagram of an example modules 500 to automatically crop video in accordance with some implementations. Video is obtained at 502. Initial per-frame scoring can be done using an active speaker analysis module 504, a person/face analysis module 506, or an aesthetic scoring module 508. A personalized score combination module 512 generates a score including a personalization value based on the personalization parameters. The combined personalized score can include individual scores from 504-508 combined with a score based on the personal criteria 510 that include identities of important faces that may be pictured in the video and/or other criteria. The personalized score can include a value from a machine-learning model trained to recognize important faces for a user in images, the model can provide an indication of an important face within a candidate crop region. The indication of the important face can include a location of each important face identified in the crop region. An important face can include a face that a user has taken a video or photo of in the past using the device; a face that is at least one of: occurs at least a threshold number of times; appears in at least a threshold proportion of the user's library, e.g., in at least 5% of images and videos in the library); appears with at least a threshold frequency (e.g., at least once a year, for a majority of years for which images/videos are in the library); etc.

In parallel with the personalized score combination 512, motion analysis 514 and/or motion and acceleration cost calculation 516 can be performed. The output of the motion cost calculation 516 and the personalized score combination 512 can be used by minimal cost path finding 518. The output of the minimal cost path finding 518 can be further processed with local optimization and heuristics 520 and then used for crop keyframing 522. The output of the minimal cost path finding 518 can also be used to calculate a quality or a confidence score 524.

The quality or confidence score can be used to determine whether to automatically crop a video or to not crop a video. For example, some videos cannot be cropped well to portrait. Having a quality or confidence measure that indicates the video cannot be cropped well can indicate to the system to not attempt video cropping and can instead fall back to displaying the video in letterboxed format. In another example, there may be more than one important face in a video and the faces may be arranged such that cropping would cut one or more important faces out of the video. This may be another case in which the automatic video cropping operation is not performed.

Some implementations can include additional input signals for determining where to locate a crop region. The additional input signals can include one or more of: video saliency (e.g., not just aesthetics), face quality, objects of interest (e.g., humans, animals, etc.), or personalized signals (e.g., important faces). In some implementations, the system can attempt to programmatically determine who is important in the video using one or more of detecting a camera following a person, who is looking at the camera, duration on camera, etc.

Some implementations can include a routine for smoothing camera acceleration. Some implementations can include keyframe interpolation to use Bezier splines. In some implementations, system can control changes in camera velocity.

Figure 6:
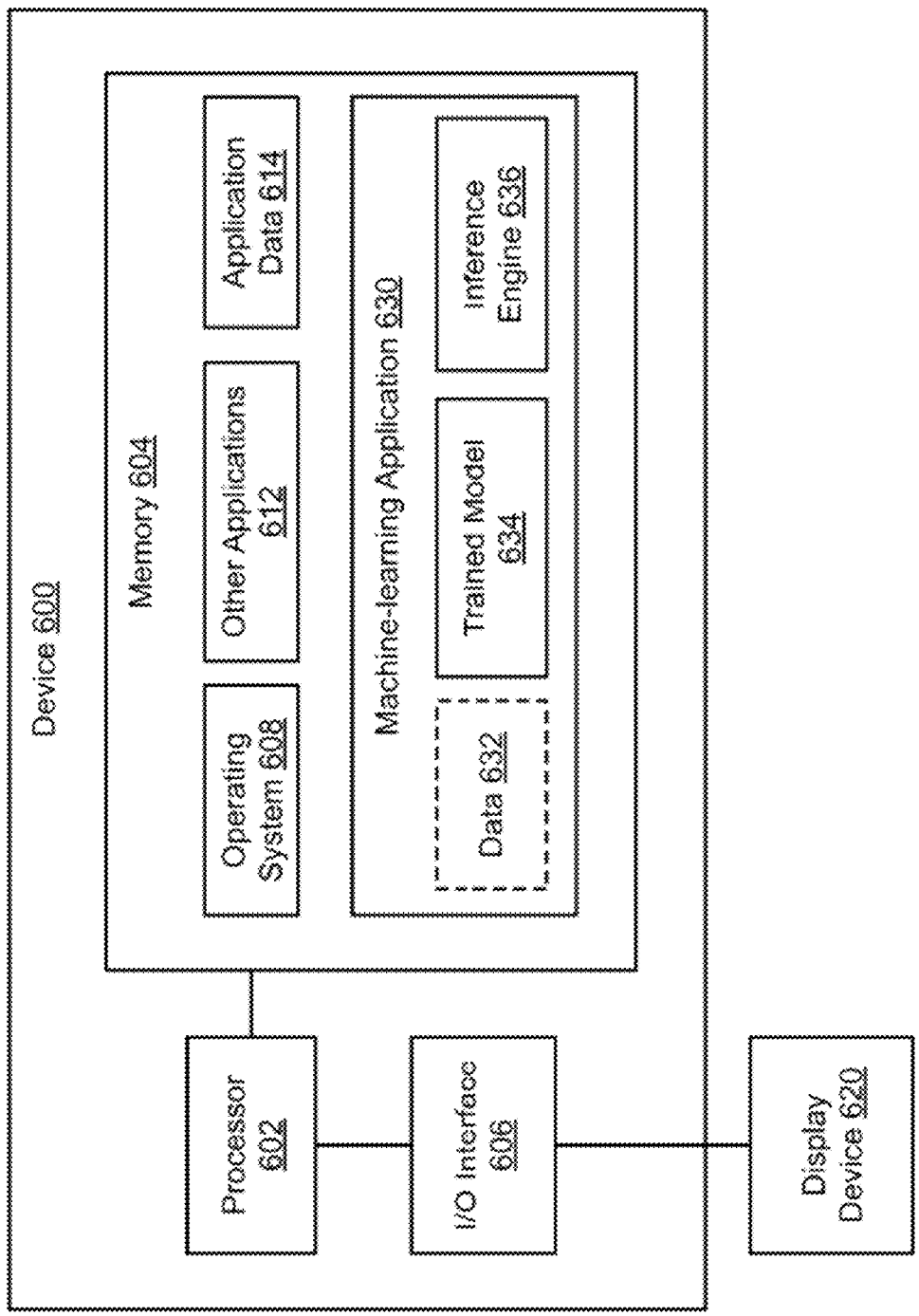
FIG. 6 is a block diagram of an example device which may be used for one or more implementations described herein.

FIG. 6 is a block diagram of an example device 600 which may be used to implement one or more features described herein. In one example, device 600 may be used to implement a client device, e.g., any of client devices 115 shown in FIG. 1. Alternatively, device 600 can implement a server device, e.g., server 104. In some implementations, device 600 may be used to implement a client device, a server device, or both client and server devices. Device 600 can be any suitable computer system, server, or other electronic or hardware device as described above.

One or more methods described herein can be run in a standalone program that can be executed on any type of computing device, as part of another program executing on any type of computing device, or as a mobile application ("app") or part of a mobile app executing on a mobile computing device (e.g., cell phone, smart phone, tablet computer, wearable device (wristwatch, armband, jewelry, headwear, virtual reality goggles or glasses, augmented reality goggles or glasses, head mounted display, etc.), laptop computer, etc.).

In some implementations, device 600 includes a processor 602, a memory 604, and input/output (I/O) interface 606. Processor 602 can be one or more processors and/or processing circuits to execute program code and control basic operations of the device 600. A "processor" includes any suitable hardware system, mechanism or component that processes data, signals or other information. A processor may include a system with a general-purpose central processing unit (CPU) with one or more cores (e.g., in a single-core, dual-core, or multi-core configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, a special-purpose processor to implement neural network model-based processing, neural circuits, processors optimized for matrix computations (e.g., matrix multiplication), or other systems. In some implementations, processor 602 may include one or more co-processors that implement neural-network processing. In some implementations, processor 602 may be a processor that processes data to produce probabilistic output, e.g., the output produced by processor 602 may be imprecise or may be accurate within a range from an expected output. Processing need not be limited to a particular geographic location or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 604 is typically provided in device 600 for access by the processor 602, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 602 and/or integrated therewith. Memory 604 can store software operating on the server device 600 by the processor 602, including an operating system 608, machine-learning application 630, other applications 612, and application data 614. Other applications 612 may include applications such as a video cropping application, data display engine, web hosting engine, image display engine, notification engine, social networking engine, etc. In some implementations, the machine-learning application 630 and/or other applications 612 can include instructions that enable processor 602 to perform functions described herein, e.g., some or all of the methods of FIGS. 4 and 5.

Other applications 612 can include, e.g., video applications, media display applications, communication applications, web hosting engines or applications, mapping applications, media sharing applications, etc. One or more methods disclosed herein can operate in several environments and platforms, e.g., as a stand-alone computer program that can run on any type of computing device, as a mobile application ("app") run on a mobile computing device, etc.

In various implementations, machine-learning application may utilize Bayesian classifiers, support vector machines, neural networks, or other learning techniques. In some implementations, machine-learning application 630 may include a trained model 634, an inference engine 636, and data 632. In some implementations, data 632 may include training data, e.g., data used to generate trained model 634. For example, training data may include any type of data such as pictures or videos taken by a user on the user device, facial identification information of people depicted in photos or videos on the user device, etc., accessed with user permission. When trained model 634 is a model that generates face signals, training data may include pictures, videos, and associated metadata.

Training data may be obtained from any source, e.g., a data repository specifically marked for training, data for which permission is provided for use as training data for machine-learning, etc. In implementations where one or more users permit use of their respective user data to train a machine-learning model, e.g., trained model 634, training data may include such user data.

In some implementations, training data may include synthetic data generated for the purpose of training, such as data that is not based on user input or activity in the context that is being trained, e.g., data generated from videos. In some implementations, machine-learning application 630 excludes data 632. For example, in these implementations, the trained model 634 may be generated, e.g., on a different device, and be provided as part of machine-learning application 630. In various implementations, the trained model 634 may be provided as a data file that includes a model structure or form, and associated weights. Inference engine 636 may read the data file for trained model 634 and implement a neural network with node connectivity, layers, and weights based on the model structure or form specified in trained model 634.

In some implementations, the trained model 634 may include one or more model forms or structures. For example, model forms or structures can include any type of neural-network, such as a linear network, a deep neural network that implements a plurality of layers (e.g., "hidden layers" between an input layer and an output layer, with each layer being a linear network), a convolutional neural network (e.g., a network that splits or partitions input data into multiple parts or tiles, processes each tile separately using one or more neural-network layers, and aggregates the results from the processing of each tile), a sequence-to-sequence neural network (e.g., a network that takes as input sequential data, such as words in a sentence, frames in a video, etc. and produces as output a result sequence), etc. The model form or structure may specify connectivity between various nodes and organization of nodes into layers.

For example, the nodes of a first layer (e.g., input layer) may receive data as input data 632 or application data 614.

For example, when trained model 634 generates face signals, the input data may include photos or videos captured by the user device. Subsequent intermediate layers may receive as input output of nodes of a previous layer per the connectivity specified in the model form or structure. These layers may also be referred to as hidden layers or latent layers.

A final layer (e.g., output layer) produces an output of the machine-learning application. For example, the output may be an indication of whether an important face is present in a video frame (or frames). In some implementations, model form or structure also specifies a number and/or type of nodes in each layer.

In different implementations, trained model 634 can include a plurality of nodes, arranged into layers per the model structure or form. In some implementations, the nodes may be computational nodes with no memory, e.g., configured to process one unit of input to produce one unit of output. Computation performed by a node may include, for example, multiplying each of a plurality of node inputs by a weight, obtaining a weighted sum, and adjusting the weighted sum with a bias or intercept value to produce the node output. In some implementations, the computation performed by a node may also include applying a step/activation function to the adjusted weighted sum. In some implementations, the step/activation function may be a nonlinear function. In various implementations, such computation may include operations such as matrix multiplication. In some implementations, computations by the plurality of nodes may be performed in parallel, e.g., using multiple processors cores of a multicore processor, using individual processing units of a GPU, or special-purpose neural circuitry. In some implementations, nodes may include memory, e.g., may be able to store and use one or more earlier inputs in processing a subsequent input. For example, nodes with memory may include long short-term memory (LSTM) nodes. LSTM nodes may use the memory to maintain "state" that permits the node to act like a finite state machine (FSM). Models with such nodes may be useful in processing sequential data, e.g., words in a sentence or a paragraph, frames in a video, speech or other audio, etc.

In some implementations, trained model 634 may include weights for individual nodes. For example, a model may be initiated as a plurality of nodes organized into layers as specified by the model form or structure. At initialization, a respective weight may be applied to a connection between each pair of nodes that are connected per the model form, e.g., nodes in successive layers of the neural network. For example, the respective weights may be randomly assigned, or initialized to default values. The model may then be trained, e.g., using data 632, to produce a result.

For example, training may include applying supervised learning techniques. In supervised learning, the training data can include a plurality of inputs (photos or videos) and a corresponding expected output for each input (e.g., presence of one or more important faces, etc.). Based on a comparison of the output of the model with the expected output, values of the weights are automatically adjusted, e.g., in a manner that increases a probability that the model produces the expected output when provided similar input.

In some implementations, training may include applying unsupervised learning techniques. In unsupervised learning, only input data may be provided and the model may be trained to differentiate data, e.g., to cluster input data into a plurality of groups, where each group includes input data that are similar in some manner, e.g., have similar important faces present in the photo or video frames. For example, the model may be trained to differentiate video frames or cropping rectangles that contain an important face from those that contain a face that is not important or frames that do not contain a face.

In some implementations, unsupervised learning may be used to produce knowledge representations, e.g., that may be used by machine-learning application 630. For example, unsupervised learning may be used to produce personalized parameters signals that are utilized as described above with reference to FIGS. 4 and 5. In various implementations, a trained model includes a set of weights corresponding to the model structure. In implementations where data 632 is omitted, machine-learning application 630 may include trained model 634 that is based on prior training, e.g., by a developer of the machine-learning application 630, by a third-party, etc. In some implementations, trained model 634 may include a set of weights that are fixed, e.g., downloaded from a server that provides the weights.

Machine-learning application 630 also includes an inference engine 636. Inference engine 636 is configured to apply the trained model 634 to data, such as application data 614, to provide an inference. In some implementations, inference engine 636 may include software code to be executed by processor 602. In some implementations, inference engine 636 may specify circuit configuration (e.g., for a programmable processor, for a field programmable gate array (FPGA), etc.) permitting processor 602 to apply the trained model. In some implementations, inference engine 636 may include software instructions, hardware instructions, or a combination. In some implementations, inference engine 636 may offer an application programming interface (API) that can be used by operating system 608 and/or other applications 612 to invoke inference engine 636, e.g., to apply trained model 634 to application data 614 to generate an inference. For example, the inference for an important face model may be a categorization of a video frame or cropping rectangle, e.g., based on comparison with previously captured photos or videos having one or more important faces.

Machine-learning application 630 may provide several technical advantages. For example, when trained model 634 is generated based on unsupervised learning, trained model 634 can be applied by inference engine 636 to produce knowledge representations (e.g., numeric representations) from input data, e.g., application data 614. For example, a model trained to generate face signals may produce representations of calls that have a smaller data size (e.g., 1 KB) than input audio recordings (e.g., 1 MB). In some implementations, such representations may be helpful to reduce processing cost (e.g., computational cost, memory usage, etc.) to generate an output (e.g., a label, a classification, etc.).

In some implementations, such representations may be provided as input to a different machine-learning application that produces output from the output of inference engine 636. In some implementations, knowledge representations generated by machine-learning application 630 may be provided to a different device that conducts further processing, e.g., over a network. For example, face signals generated using the techniques described with reference to FIG. 4 or 5 can be provided to client devices for use in automatic video cropping using personalized parameters, as described with reference to FIG. 4 or 5. In such implementations, providing the knowledge representations rather than the photos or videos of important faces may provide a technical benefit, e.g., enable faster data transmission with reduced cost. In another example, a model trained to cluster important faces may produce clusters from input photos or videos.

The clusters may be suitable for further processing (e.g., determining whether an important face is present in a video frame or cropping rectangle, etc.) without the need to access original photos or videos, and therefore, save computational cost.

In some implementations, machine-learning application 630 may be implemented in an offline manner. In these implementations, trained model 634 may be generated in a first stage and provided as part of machine-learning application 630. In some implementations, machine-learning application 630 may be implemented in an online manner. For example, in such implementations, an application that invokes machine-learning application 630 (e.g., operating system 608, one or more of other applications 612) may utilize an inference produced by machine-learning application 630, e.g., provide the inference to a user, and may generate system logs (e.g., if permitted by the user, an action taken by the user based on the inference; or if utilized as input for further processing, a result of the further processing). System logs may be produced periodically, e.g., hourly, monthly, quarterly, etc. and may be used, with user permission, to update trained model 634, e.g., to update important face data for trained model 634.

In some implementations, machine-learning application 630 may be implemented in a manner that can adapt to particular configuration of device 600 on which the machine-learning application 630 is executed. For example, machine-learning application 630 may determine a computational graph that utilizes available computational resources, e.g., processor 602. For example, machine-learning application 630 may determine that processor 602 includes a GPU with a particular number of GPU cores (e.g., 1000) and implement the inference engine accordingly (e.g., as 1000 individual processes or threads).

In some implementations, machine-learning application 630 may implement an ensemble of trained models. For example, trained model 634 may include a plurality of trained models that are each applicable to same input data. In these implementations, machine-learning application 630 may choose a particular trained model, e.g., based on available computational resources, success rate with prior inferences, etc. In some implementations, machine-learning application 630 may execute inference engine 636 such that a plurality of trained models is applied. In these implementations, machine-learning application 630 may combine outputs from applying individual models, e.g., using a voting-technique that scores individual outputs from applying each trained model, or by choosing one or more particular outputs. Further, in these implementations, machine-learning application may apply a time threshold for applying individual trained models (e.g., 0.5 ms) and utilize only those individual outputs that are available within the time threshold. Outputs that are not received within the time threshold may not be utilized, e.g., discarded. For example, such approaches may be suitable when there is a time limit specified while invoking the machine-learning application, e.g., by operating system 608 or one or more applications 612, e.g., to automatically crop videos based on whether one or more important faces are detected and other personalized criteria.

In different implementations, machine-learning application 630 can produce different types of outputs. For example, machine-learning application 630 can provide representations or clusters (e.g., numeric representations of input data), labels (e.g., for input data that includes images, documents, audio recordings, etc.), etc. In some implementations, machine-learning application 630 may produce an output based on a format specified by an invoking application, e.g. operating system 608 or one or more applications 612.

Any of software in memory 604 can alternatively be stored on any other suitable storage location or computer-readable medium. In addition, memory 604 (and/or other connected storage device(s)) can store one or more messages, one or more taxonomies, electronic encyclopedia, dictionaries, thesauruses, knowledge bases, message data, grammars, face identifiers (e.g., important faces), and/or other instructions and data used in the features described herein. Memory 604 and any other type of storage (magnetic disk, optical disk, magnetic tape, or other tangible media) can be considered "storage" or "storage devices."

I/O interface 606 can provide functions to enable interfacing the device 600 with other systems and devices. Interfaced devices can be included as part of the device 600 or can be separate and communicate with the device 600. For example, network communication devices, storage devices (e.g., memory and/or database 106), and input/output devices can communicate via I/O interface 606. In some implementations, the I/O interface can connect to interface devices such as input devices (keyboard, pointing device, touchscreen, microphone, camera, scanner, sensors, etc.) and/or output devices (display devices, speaker devices, printers, motors, etc.). I/O interface 606 can also include a telephony interface, e.g., to couple device 600 to a cellular network or other telephony network.

Some examples of interfaced devices that can connect to I/O interface 606 can include one or more display devices 620 that can be used to display content, e.g., images, video, and/or a user interface of an output application as described herein. Display device 620 can be connected to device 600 via local connections (e.g., display bus) and/or via networked connections and can be any suitable display device. Display device 620 can include any suitable display device such as an LCD, LED, or plasma display screen, CRT, television, monitor, touchscreen, 3-D display screen, or other visual display device. For example, display device 620 can be a flat display screen provided on a mobile device, multiple display screens provided in a goggles or headset device, or a monitor screen for a computer device.

For ease of illustration, FIG. 6 shows one block for each of processor 602, memory 604, I/O interface 606, and software blocks 608, 612, and 630. These blocks may represent one or more processors or processing circuitries, operating systems, memories, I/O interfaces, applications, and/or software modules. In other implementations, device 600 may not have all of the components shown and/or may have other elements including other types of elements instead of, or in addition to, those shown herein. While some components are described as performing blocks and operations as described in some implementations herein, any suitable component or combination of components of environment 100, device 600, similar systems, or any suitable processor or processors associated with such a system, may perform the blocks and operations described.

Methods described herein can be implemented by computer program instructions or code, which can be executed on a computer. For example, the code can be implemented by one or more digital processors (e.g., microprocessors or other processing circuitry) and can be stored on a computer program product including a non-transitory computer readable medium (e.g., storage medium), such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

Although the description has been described with respect to particular implementations thereof, these particular implementations are merely illustrative, and not restrictive. Concepts illustrated in the examples may be applied to other examples and implementations.

In situations in which certain implementations discussed herein may collect or use personal information about users (e.g., user data, facial recognition data, information about a user's social network, user's location and time at the location, user's biometric information, user's activities and demographic information), users are provided with one or more opportunities to control whether information is collected, whether the personal information is stored, whether the personal information is used, and how the information is collected about the user, stored and used. That is, the systems and methods discussed herein collect, store and/or use user personal information specifically upon receiving explicit authorization from the relevant users to do so. For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user device's geographic location may be generalized to a larger region so that the user's particular location cannot be determined.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

The invention claimed is:

1. A computer-implemented method comprising:
    determining a per-frame crop score for two or more candidate crop regions in each frame of a plurality of frames of an input video, wherein the crop score is based on one or more of: a score based on face analysis, a score based on active speaker analysis, or an aesthetic score, and wherein the candidate crop regions each have an output aspect ratio that is different than an input aspect ratio of the input video;
    determining a respective motion cost for each candidate crop region by analyzing frame to frame motion of the candidate crop region;
    determining a minimal cost path that represents crop region locations for the input video based on the respective motion cost and the per-frame crop score of the two or more candidate crop regions;
    generating crop keyframing corresponding to the crop region locations along the minimal cost path, wherein the crop keyframing includes a start frame, an end frame, and the crop region location; and
    outputting a modified video based on the crop keyframing.

2. The computer-implemented method of claim 1, wherein determining the per-frame crop score is based on a heuristic that determines a combination of two or more of: the score based on face analysis, the score based on active speaker analysis, and the aesthetic score.

3. The computer-implemented method of claim 1, wherein the crop score is further based on one or more of a score based on object detection, a score based on pet or animal detection, or a score based on optical character recognition (OCR) on the frame.

4. The computer-implemented method of claim 1, wherein outputting the modified video comprises outputting crop keyframes and path.

5. The computer-implemented method of claim 4, wherein the crop keyframes and the path are stored as video metadata associated with the input video and are usable for video playback by a viewer application to crop the input video during the video playback.

6. The computer-implemented method of claim 5, wherein a plurality of crop keyframes and paths are stored in the video metadata, and wherein, upon initiation of the video playback, a particular set of crop keyframes and path that match the viewer application aspect ratio are provided to the viewer application.

7. The computer-implemented method of claim 5, wherein upon detection of a change in orientation of a device that performs the video playback, a different set of crop keyframes and path that match the orientation of the device are utilized for the video playback.

8. The computer-implemented method of claim 1, wherein determining the per-frame crop score is based on a user that views the modified video, and wherein the modified video is personalized to the user.

9. The computer-implemented method of claim 8, wherein determining the per-frame crop score comprises:
    generating a face signal that indicates whether one or more important faces are present in the frame, wherein the one or more important faces are associated with the user, and wherein the score based on face analysis is personalized based on the face signal.

10. The computer-implemented method of claim 9, wherein the score based on the face analysis is personalized based on one or more of a degree to which the one or more important faces are in each candidate crop region or a location of the one or more important faces within each candidate crop region.

11. A non-transitory computer readable medium having stored thereon software instructions that, when executed by one or more processors, cause the one or more processors to perform operations comprising:
   determining a per-frame crop score for two or more candidate crop regions in each frame of a plurality of frames of an input video, wherein the crop score is based on one or more of: a score based on face analysis, a score based on active speaker analysis, or an aesthetic score, and wherein the candidate crop regions each have an output aspect ratio that is different than an input aspect ratio of the input video;
   determining a respective motion cost for each candidate crop region by analyzing frame to frame motion of the candidate crop region;
   determining a minimal cost path that represents crop region locations for the input video based on the respective motion cost and the per-frame crop score of the two or more candidate crop regions;
   generating crop keyframing corresponding to the crop region locations along the minimal cost path, wherein the crop keyframing includes a start frame, an end frame, and the crop region location; and
   outputting a modified video based on the crop keyframing.

12. The non-transitory computer readable medium of claim 11, wherein determining the per-frame crop score is based on a heuristic that determines a combination of two or more of: the score based on face analysis, the score based on active speaker analysis, and the aesthetic score.

13. The non-transitory computer readable medium of claim 11, wherein the crop score is further based on one or more of a score based on object detection, a score based on pet or animal detection, or a score based on optical character recognition (OCR) on the frame.

14. The non-transitory computer readable medium of claim 11, wherein outputting the modified video comprises outputting crop keyframes and path, and wherein, upon initiation of video playback on a device, the crop keyframes and the path that match an orientation of the device are utilized for the video playback.

15. The non-transitory computer readable medium of claim 11, wherein determining the per-frame crop score comprises generating a face signal that indicates whether one or more important faces are present in the frame, wherein the one or more important faces are associated with a user that is viewing the modified video, and wherein the score based on face analysis is personalized based on the face signal.

16. A system comprising:
   one or more processors coupled to a non-transitory computer readable medium having stored thereon software instructions that, when executed by the one or more processors, cause the one or more processors to perform operations comprising:
   determining a per-frame crop score for two or more candidate crop regions in each frame of a plurality of frames of an input video, wherein the crop score is based on one or more of: a score based on face analysis, a score based on active speaker analysis, or an aesthetic score, and wherein the candidate crop regions each have an output aspect ratio that is different than an input aspect ratio of the input video;
   determining a respective motion cost for each candidate crop region by analyzing frame to frame motion of the candidate crop region;
   determining a minimal cost path that represents crop region locations for the input video based on the respective motion cost and the per-frame crop score of the two or more candidate crop regions;
   generating crop keyframing corresponding to the crop region locations along the minimal cost path, wherein the crop keyframing includes a start frame, an end frame, and the crop region location; and
   outputting a modified video based on the crop keyframing.

17. The system of claim 16, wherein determining the per-frame crop score is based on a heuristic that determines a combination of two or more of: the score based on face analysis, the score based on active speaker analysis, and the aesthetic score.

18. The system of claim 16, wherein the crop score is further based on one or more of a score based on object detection, a score based on pet or animal detection, or a score based on optical character recognition (OCR) on the frame.

19. The system of claim 16, wherein outputting the modified video comprises outputting crop keyframes and path, and wherein, upon initiation of video playback on a device, the crop keyframes and the path that match an orientation of the device are utilized for the video playback.

20. The system of claim 16, wherein determining the per-frame crop score comprises generating a face signal that indicates whether one or more important faces are present in the frame, wherein the one or more important faces are associated with a user that is viewing the modified video, and wherein the score based on face analysis is personalized based on the face signal.

* * * * *